United States Patent [19]

Kume

[11] Patent Number: 5,150,382
[45] Date of Patent: Sep. 22, 1992

[54] FREQUENCY ERROR DETECTING APPARATUS

[75] Inventor: Atsuya Kume, Hyogo, Japan

[73] Assignee: Mitsubishi Denki Kabushiki Kaisha, Tokyo, Japan

[21] Appl. No.: 675,200

[22] Filed: Mar. 26, 1991

[30] Foreign Application Priority Data

Jun. 20, 1990 [JP] Japan ................................ 2-162395

[51] Int. Cl.$^5$ .............................................. H03D 3/04
[52] U.S. Cl. ...................................... 375/88; 329/303; 375/97
[58] Field of Search ............... 324/78 R, 782; 375/10, 375/88, 89, 97; 329/300, 303, 315, 341; 455/67, 205, 208, 266

[56] References Cited

U.S. PATENT DOCUMENTS 4,574,247 3/1986 Jacob ..................................... 375/88
4,616,187 10/1986 Watanabe ............................ 329/303

FOREIGN PATENT DOCUMENTS

62-108620 5/1987 Japan .

Primary Examiner—Benedict V. Safourek
Attorney, Agent, or Firm—Rothwell, Figg, Ernst & Kurz

[57] ABSTRACT

A frequency error detecting apparatus for an FSK signal communication system in which data symbols are represented by frequencies displaced from a center frequency, includes a counter for counting the number of each type of data symbol in a received signal over a specific period of time, and a multiplier for multiplying the counted number of symbols by the displacement frequency for each symbol to produce a correction value. A counting unit counts the total number of cycles of the received signal over the specific time period to output a counted number which is proportional to the center frequency of the received signal. The correction value is subtracted from this counted number so that a corrected center frequency may be produced which is then compared with the internal center frequency of the receiver, so that a frequency error may be determined.

11 Claims, 10 Drawing Sheets

FREQUENCY ERROR DETECTING APPARATUS

BACKGROUND OF THE INVENTION

1. Field of the Invention

The present invention relates to a frequency error detecting apparatus suitable for use in a receiving apparatus for receiving a digitally-modulated signal such as an FSK (Frequency Shift Keying) signal, which is adapted to detect an error, i.e., a difference between the center frequency of a received signal and the center frequency which has been generated by the receiving apparatus.

2. Description of the Related Art

Figure 1:
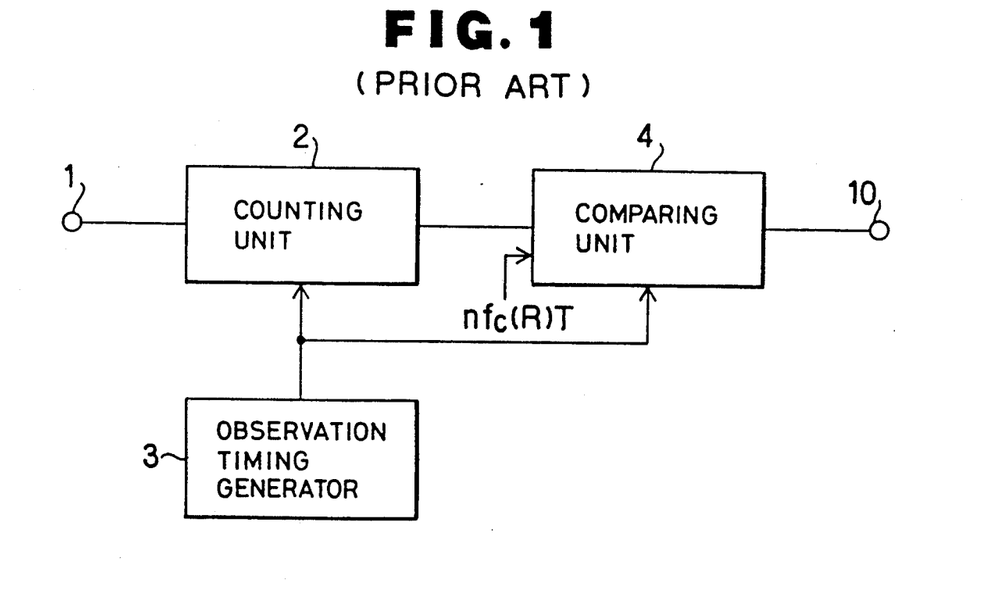
FIG. 1 is a block diagram showing a conventional frequency error detecting apparatus.

FIG. 1 is a block diagram showing a conventional frequency error detecting apparatus. In the same drawing, there are shown an input terminal 1 to which a signal to be received is applied, a counting unit 2 for counting the number of cycles of the received signal within a specific time period, an observation timing generating apparatus 3 for generating a timing cycle for the error detection, a comparing unit 4 for making comparison between a value counted by the counting unit 2 and a predetermined value, and an output terminal 10.

An operation of the frequency error detecting apparatus will now be described. A description will be made herein in a case where a binary frequency-shift keying (hereinafter called "binary FSK") signal is inputted as a signal to be received. First of all, the counting unit 2 counts the number of cycles of a signal inputted to the input terminal 1 over a predetermined time period. For example, when a signal to be inputted to counting unit 2 is a single tone signal of 1,750 Hz, a value to be counted by the counting unit 2 after 1 second has elapsed is 1,750. The observation timing generating apparatus 3 applies an observation start timing signal and an observation completion timing signal to the counting unit 2. When the counting unit 2 responds to the observation start timing signal from the observation timing generating apparatus 3, it starts counting, while when it responds to the observation completion timing signal therefrom, it outputs a counted value.

The binary FSK signal is used to represent two data symbols, "0" and "1". When the center frequency of the signal is set to $f_c$, $f_c + \Delta f$ is assigned to the data "0" whereas $f_c - \Delta f$ is assigned to the data "1". $\Delta f$ will hereinafter be called a displacement or shift frequency ($\Delta f$ is a positive value). When data produced on the transmission side are added up over a sufficiently long period of time, the added-up data "0"/"1" ratios are considered as being equal to each other. In other words, a value outputted from the counting unit 2 should be equal to (the center frequency $f_c$) × (observed period). Then, the comparing unit 4 compares the counted value and $nf_c(R)T$, where T is the inverse of the data transmission rate (for example, 1/300 in the case of a 300 bps rate), n is the number of bits of data received for the observed period, and nT represents the observed period. In addition, $f_c(R)$ represents the center frequency which has been set in the receiving apparatus. Thus, a value $(f_c - f_c(R)) \times$ (observed period) is obtained as a result of the above comparison by the comparing unit 4. If the resultant value is divided by the observed period, a frequency error can be obtained.

Incidentally, the comparing unit 4 can obtain a frequency error by merely comparing a value inputted from the counting unit 2 and $f_c(R)$ provided that the counting unit 2 outputs a value equal to the counted value divided by the observed period. Then, the resultant frequency error is outputted from the output terminal 10.

Since the conventional frequency error detecting apparatus is constructed as described above, it is necessary to make the observed period relatively long for purposes of an improvement in the accuracy of error detection. In addition, since the probabilities of occurrence of the data "0" and "1" are assumed as being equal to each other, errors in detecting become greater where data generated on the transmission side is shifted as to its distribution, thereby causing a problem.

SUMMARY OF THE INVENTION

With the foregoing problems in view, it is an object of this invention to provide a frequency error detecting apparatus which can detect a frequency error with high accuracy and at a high speed without being affected by the particular distribution of data produced on a transmission side.

According to a first aspect of this invention, there is provided a frequency error detecting apparatus comprising:

a counting means for counting the number of cycles of an input signal for an observed period of time;

means for receiving a train of symbols obtained by demodulating the input signal with a receiving apparatus within the observed period of time to thereby count the number of the respective symbols included in the train of symbols and for multiplying the difference between the internal center frequency $f_c(R)$ and a frequency assigned to each of the symbols by each value obtained by counting the number of symbols and the inverse of the data transmission rate for each symbol type to thereby obtain the thus-multiplied results and for adding together the results obtained according to the respective symbols;

second means for subtracting a value outputted from the first means from a value counted by the counting means; and a comparing means for comparing the internal center frequency $f_c(R)$ with a value outputted from the second means to thereby output an error corresponding to the difference between the center frequency $f_c$ of the input signal and the internal center frequency $f_c(R)$.

According to a second aspect of this invention, there is provided a frequency error detecting apparatus comprising:

a counting means for counting the number of cycles of an input signal for an observed period of time;

first means for receiving a train of symbols obtained by demodulating the input signal with a receiving apparatus within the observed period of time to thereby count the number of the respective symbols included in the train of symbols and for multiplying a frequency assigned to each of the symbols by each value obtained by counting the number of symbols and the inverse of the data transmission rate for each symbol type to thereby obtain the thus-multiplied results and for adding together the results obtained according to the respective symbols;

second means for subtracting a value outputted from the first means from a value counted by the counting means; and a comparing means for dividing a value outputted from the second means by the observed period of time to thereby obtain an error corresponding to the difference between the center frequency $f_c$ of the input signal and the internal center frequency $f_c(R)$ of the receiver.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

One embodiment of this invention will hereinafter be described with reference to the accompanying drawings.

Figure 9A:
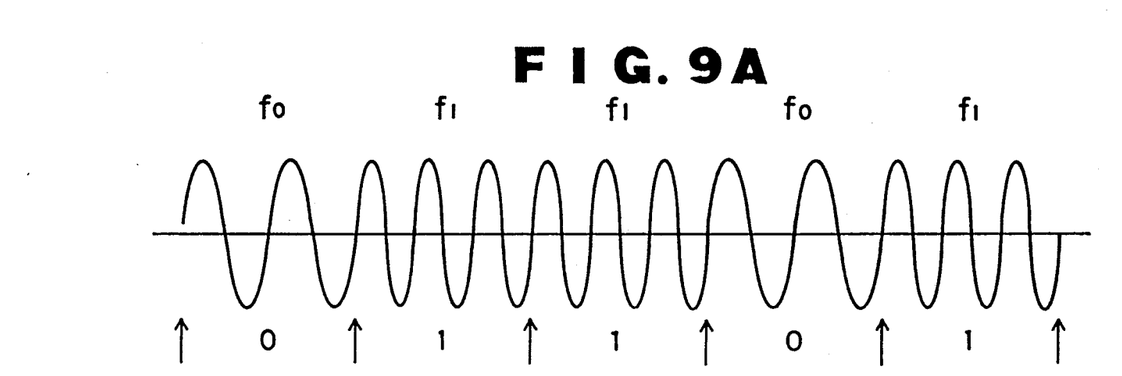
FIG. 9A is a waveform of a binary FSK signal.

An example of a binary FSK signal is shown in the waveform of FIG. 9A. Such a signal consists of two frequencies, $f_0$ and $f_1$, such that $f_0 =$ "0" and $f_1 =$ "1" at the receiver. The center frequency $f_c$ is equal to $(f_0 + f_1)/2$.

Figure 2:
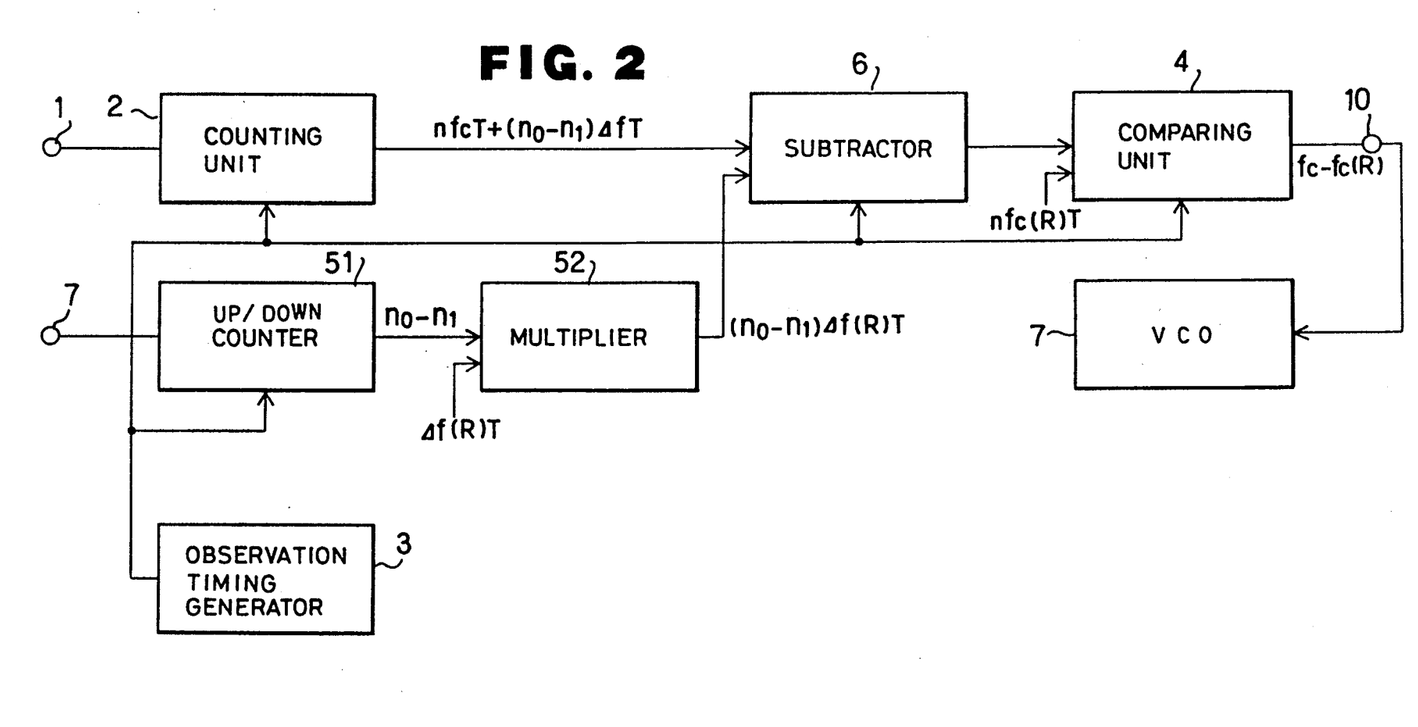
FIG. 2 is a block diagram depicting a frequency error detecting apparatus according to one embodiment of this invention, which is adapted to detect a frequency error in a binary FSK signal.

Referring now to FIG. 2, designated at numeral 51 is an up/down counter for counting a number $n_0$ of data "0" symbols and a number $n_1$ of data "1" symbols of a binary FSK signal, both of which are inputted from a data input terminal 7 over an observed period of time so as to output the difference between $n_0$ and $n_1$, i.e., $n_0 - n_1$. Specifically, counter 51 counts "up" when a "0" symbol is received and counts "down" when a "1" symbol is received. Designated at numeral 52 is a multiplier for multiplying the number $(n_0 - n_1)$ by a number $\Delta f(R)$, which is a shift or displacement frequency that is equal to the difference between the center frequency $f_c(R)$ set in the receiving apparatus and a frequency assigned to each data symbol, and by a number T being the inverse of the data transmission rate. Designated at numeral 6 is a subtractor for outputting the difference between a value counted by a counting unit 2 and the output from the multiplier 52. Other parts shown in FIG. 2 are identified by like reference numerals and are identical to those depicted in FIG. 1. When the binary FSK signal is adopted, the absolute values of shift frequencies representative of the data "0" and "1" are equal to each other (they are opposite in sign). It is therefore practical to omit the arithmetic operation of $n_0\Delta f(R)T + n_1(-\Delta f(R))T$ by calculating the difference $(n_0 - n_1)$ in advance ($\Delta f(R)$ is a positive value).

A description will now be made of the operation of the first embodiment. First of all, the counting unit 2 counts the number of cycles included in an input signal which appears within an observed period determined by observation timing generator 3. Assuming that the input signal received during the observed period is demodulated to obtain desired binary data, the number of bits of which is defined as n and the data "0" and "1" have an equal probability of being produced within a train or sequence of data, then the value counted by the counting unit 2 is $nf_cT$. However, when the data "0" and "1" do not have an equal probability of being produced, the counted value becomes $(f_c + \Delta f)n_0T + (f_c - \Delta f)n_1T = nf_cT + (n_0 - n_1)\Delta fT$, where $n = n_0 + n_1$. According to this formula, the shift frequency $\Delta f$ has an effect on the counted value according to the second term in the above expression.

On the other hand, the up/down counter 51 serves to count the number of the data "0" symbols and the number of the data "1" symbols within the sequence of data, both of which are inputted to the data input terminal 7, and outputs the difference therebetween. The sequence of data is obtained by demodulating the input signal in a demodulating apparatus (not shown). In general, a timing at which an input signal inputted to the input terminal 1 is demodulated to obtain a train of binary data, which is in turn inputted to the data input terminal 7, is delayed as compared with a timing at which the input signal is applied to the input terminal 1. However, the delay developed therebetween is negligible, thereby causing no problem. Then, the counter 51 serves to output the difference $n_0 - n_1$ within the observed period at a time at which the observed period is terminated. The multiplier 52 multiplies the output from the counter 51 by the shift frequency $\Delta f(R)$ of the receiver and then by the inverse T of the data transmission rate. Thus, the multiplier 52 outputs $(n_0 - n_1)\Delta f(R)T$ as a correction value upon completion of the observed period.

Then, the subtractor 6 serves to subtract the correction value outputted from the multiplier 52, from the output of the counting unit 2. Accordingly, the subtractor 6 outputs $nf_cT + (n_0 - n_1)(\Delta f - \Delta f(R))T$. Since the shift frequencies $\Delta f$, $\Delta f(R)$ are sufficiently small as compared with the center frequency $f_c$, an error, i.e., the difference $(\Delta f - \Delta f(R))$ is also small and can be neglected. Accordingly, the output of the subtractor 6 may be considered equal to $nf_cT$. In other words, the correction value outputted from multiplier 52 negates the effects of the shift frequency $\Delta f$ included in the count value outputted from the counting unit 2.

Then the comparing unit 4 subtracts, from the output $nf_cT$ of the subtractor 6, the product of the internal center frequency $f_c(R)$ of the receiver and the observed period $nT$ i.e., $nf_c(R)T$. Further, the thus obtained product is divided in the unit 4 by the observed period to thereby obtain the error, i.e., the difference $(f_c - f_c(R))$ between the center frequencies $f_c$ and $f_c(R)$, which is in turn applied from an output terminal 10 to a Voltage Controlled Oscillator (VCO) 7 in order to correct the internal frequency used for demodulation.

Figure 3:
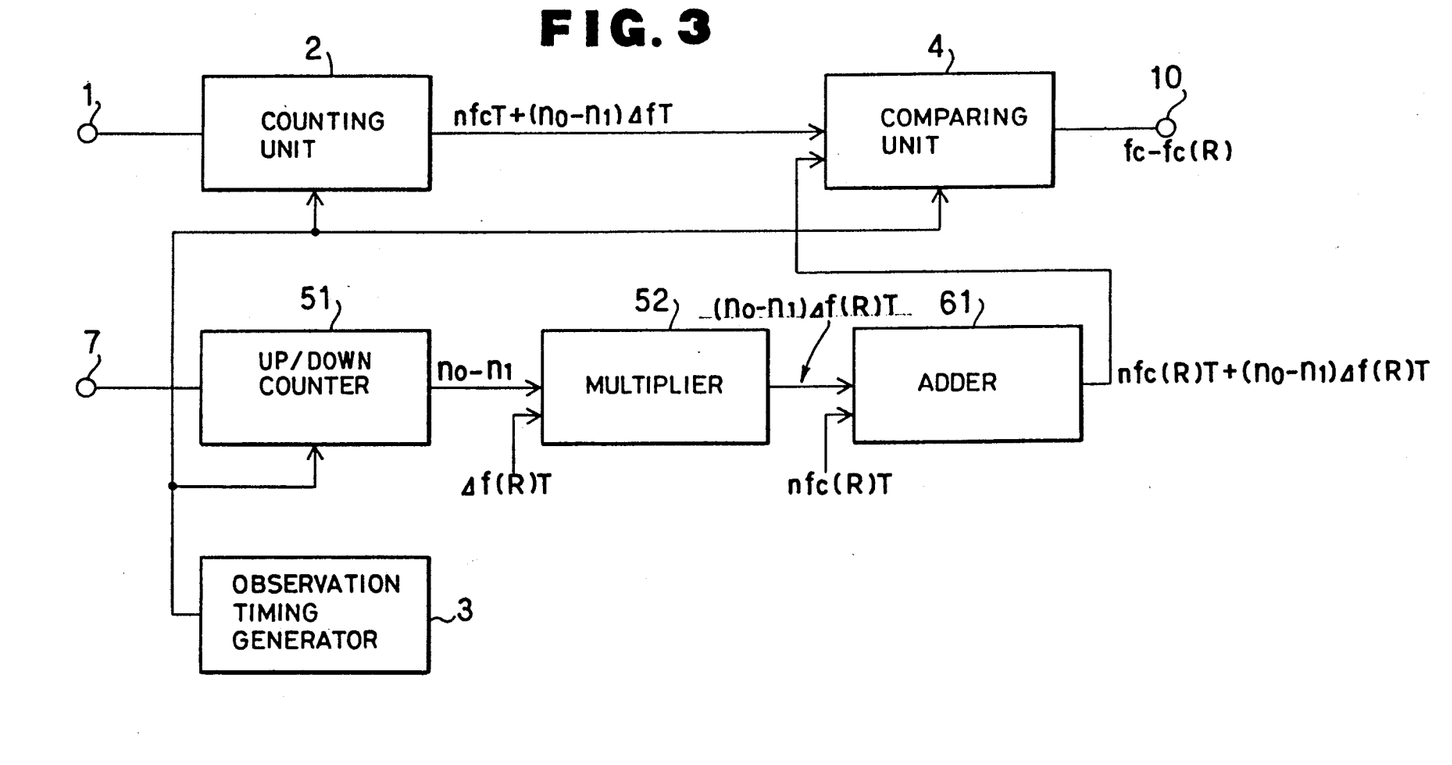
FIGS. 3 and 4 are block diagrams illustrating frequency error detecting apparatus according to other embodiments of this invention, which are adapted to detect frequency errors in binary FSK signals, respectively.

In the illustrated embodiment, after the subtractor 6 corrects the output from the counting unit 2 by subtracting the value $(n_0-n_1)\Delta f(R)T$ produced by the multiplier 52 therefrom, the comparing unit 4 compares the thus corrected output with $nf_c(R)T$. In an alternative embodiment, as shown in FIG. 3, an adder 61 adds the output of the multiplier 52 to $nf_c(R)T$ and the comparing unit 4 may compare the result of the addition with the output from the counting unit 2. In this case, the comparing unit 4 can output a center frequency error value by subtracting the correction value of adder 61 from the value counted by the counting unit 2.

Figure 4:
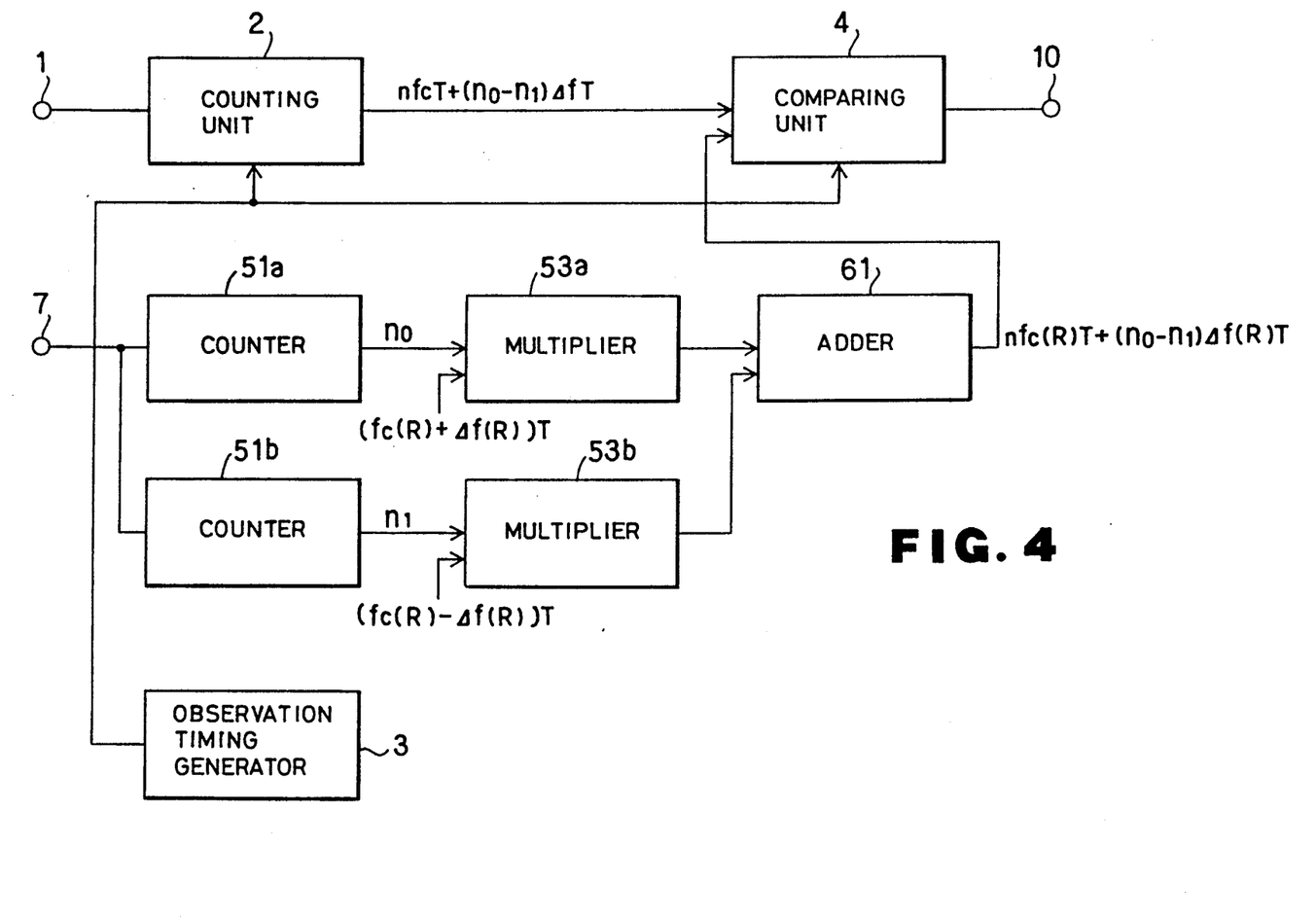

As shown in the embodiment of FIG. 4, counters 51a, 51b count $n_0$ representing the number of data "0" symbols and $n_1$ representing the number of data "1" symbols respectively. Then, multipliers 53a, 53b multiply $n_0$, $n_1$ by frequencies $(f_c(R)+\Delta f(R))$, $(f_c(R)-\Delta f(R))$ assigned to individual data, which frequencies have been set in the receiving side, respectively, and both thus-multiplied values are added together by an adder 61, so that $nf_c(R)T$ + the correction value may be obtained. In this embodiment, the same effects as those produced in the above-described embodiments can be achieved.

Figure 5A:
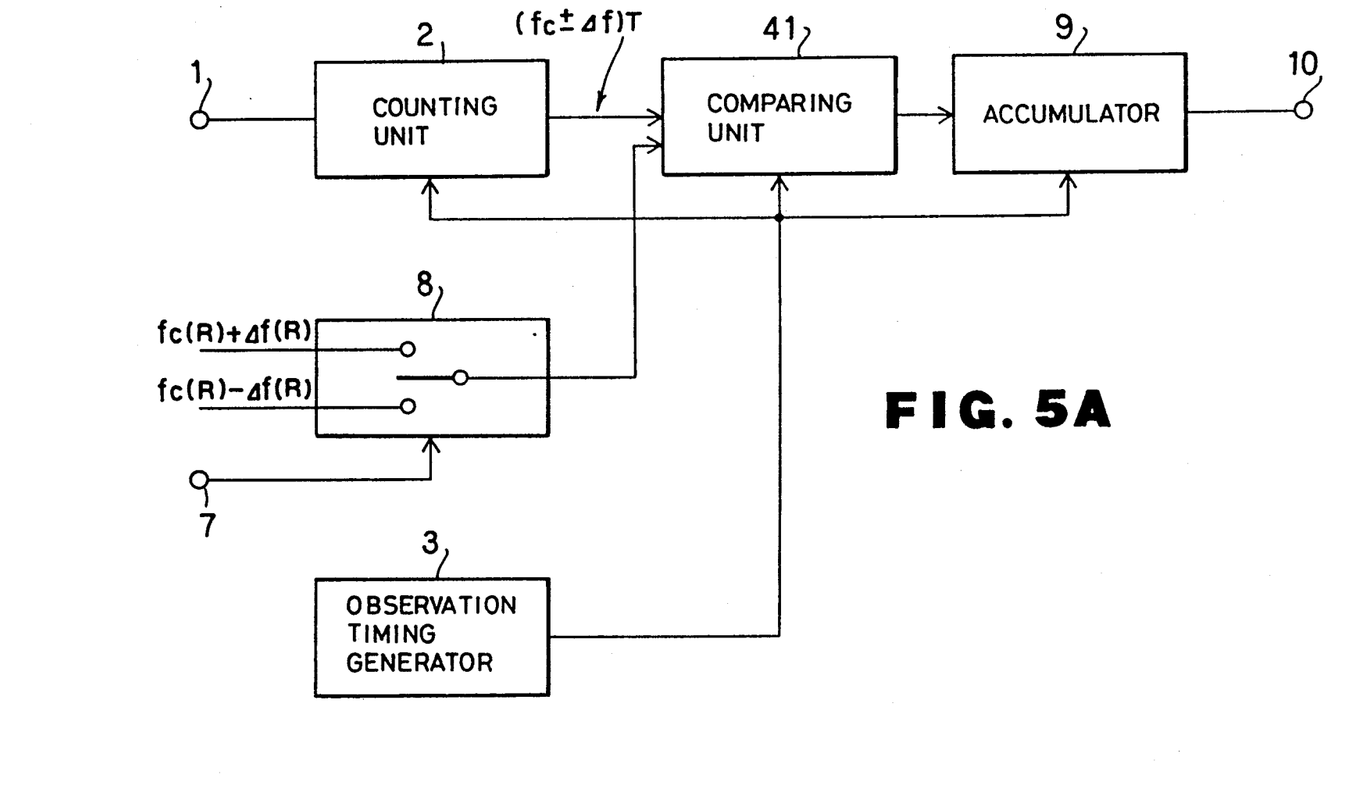
FIG. 5A is a block diagram showing a frequency error detecting apparatus according to a still further embodiment of this invention, which is adapted to detect a frequency error in a binary FSK signal.
Figure 5B:
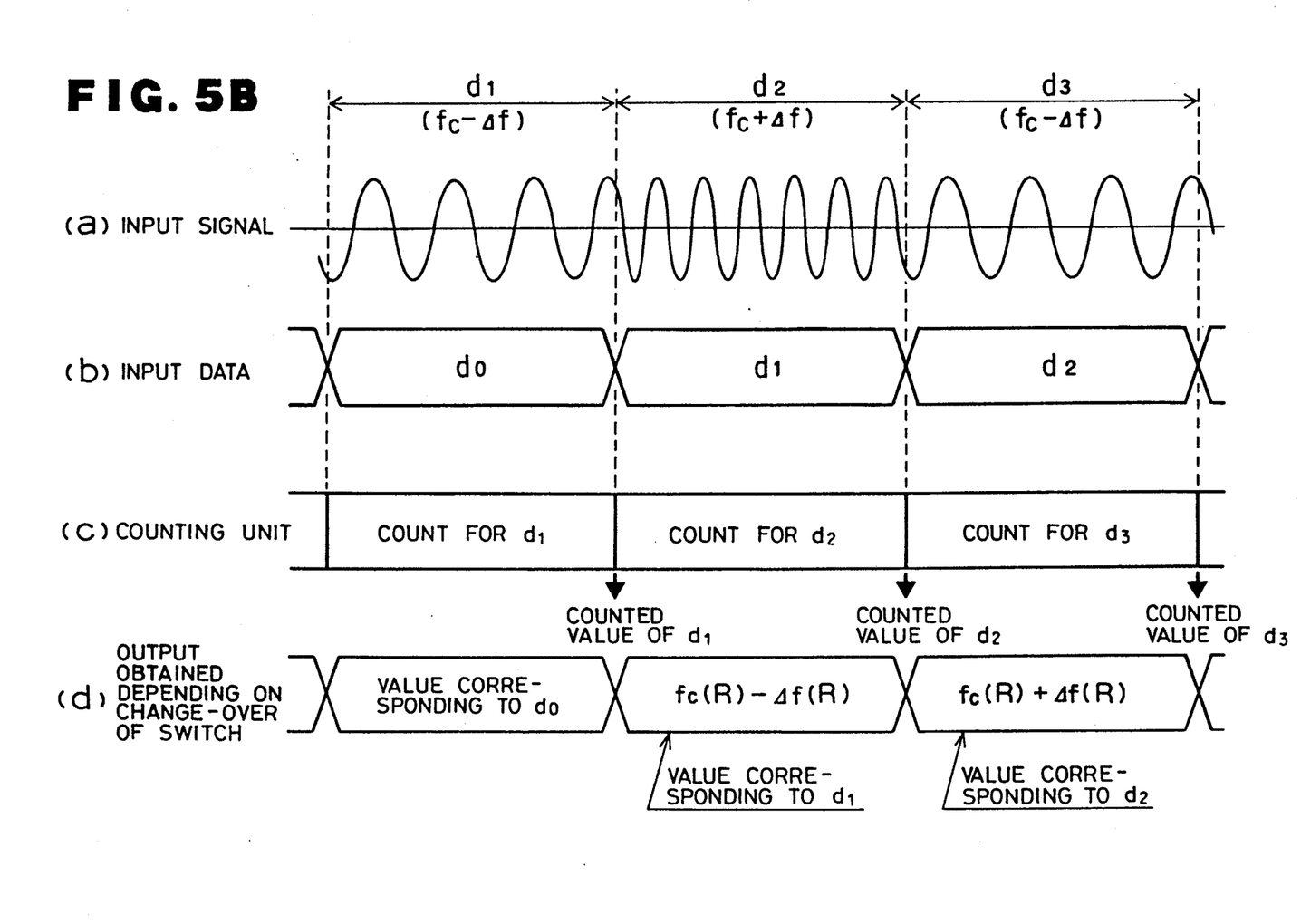
FIG. 5B is a timing chart for describing an operation of the frequency error detecting apparatus shown in FIG. 5A.

A further embodiment shown in FIG. 5A is of a type wherein values applied to a comparing unit 41 are switched for each demodulated data symbol and output values from the comparing unit 41 are cumulatively added by an accumulator 9. More specifically, when counting unit 2 externally receives a timing of change-in-data, it outputs data of already-counted values (see (c) shown in FIG. 5B). At the same time, a switch 8 is changed over to a desired contact depending on the data inputted to the data input terminal 7, so that a frequency which has been assigned to the data is outputted (see (d) shown in FIG. 5B). Then, the comparing unit 41 calculates the difference between an output from the counting unit 2 and an output obtained from the switch 8 and outputs the calculated result. For example, when a counted value representative of a calculated number of cycles of an input signal $d_1$ is outputted from the counting unit 2, (FIG. 5B (a), (c)) the switch 8 provides as an output a frequency value corresponding to the input signal $d_1$ (FIG. 5B(d)). Then the comparing unit 41 outputs the difference between the counted value and the value corresponding to the input signal $d_1$. As has already been described, the difference between $\Delta f$ and $\Delta f(R)$ is negligibly small. Therefore, an error, i.e., the difference $(f_c-f_c(R))T$ between the center frequencies for each bit may be regarded as being outputted from the comparing unit 41. Thus, a value accumulated by the accumulator 9 after the observed period nT has elapsed is $n(f_c-f_c(R))T$, whereupon the accumulator 9 outputs a value $(f_c-f_c(R))$ at output terminal 10 which is obtained by dividing the accumulated value by the observed period nT. Incidentally, a delay unit may be disposed between the counting unit 2 and the comparing unit 41 with a view toward ensuring that the output value of the switch 8 has been determined at the time that the counted value has been inputted to the comparing unit 41 from the counting unit 2.

Figure 9B:
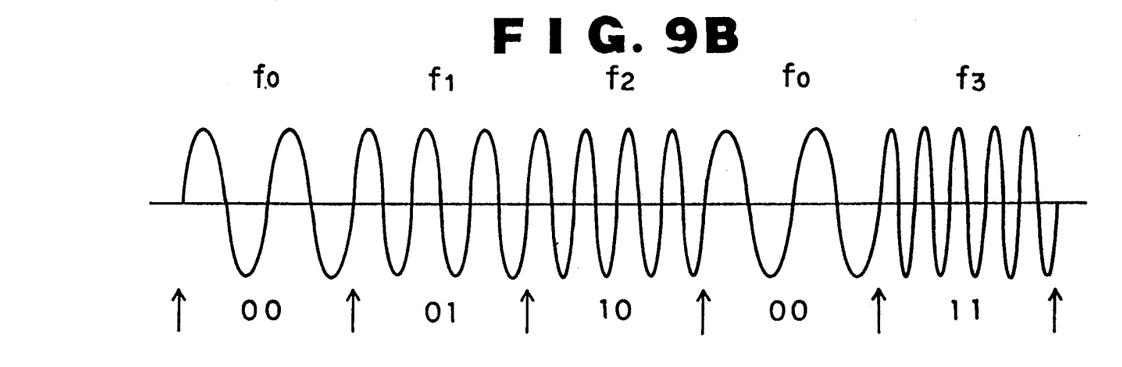
FIG. 9B is a waveform of a particular multivalue FSK signal.

FIG. 9B shows the waveform of a multivalued FSK signal, such as a four value FSK having frequencies $f_0$, $f_1$, $f_2$, and $f_3$. In such a system, each frequency represents a two bit data symbol, 00, 01, 10 or 11. In this case, the center frequency $f_c$ is equal to $(f_0+f_1+f_2+f_3)/4$. Although four frequencies have been described in this example, it is noted that the multivalue FSK signal can have any number of frequencies q which define an m-bit data symbol such that $2^m=q$.

Figure 6:
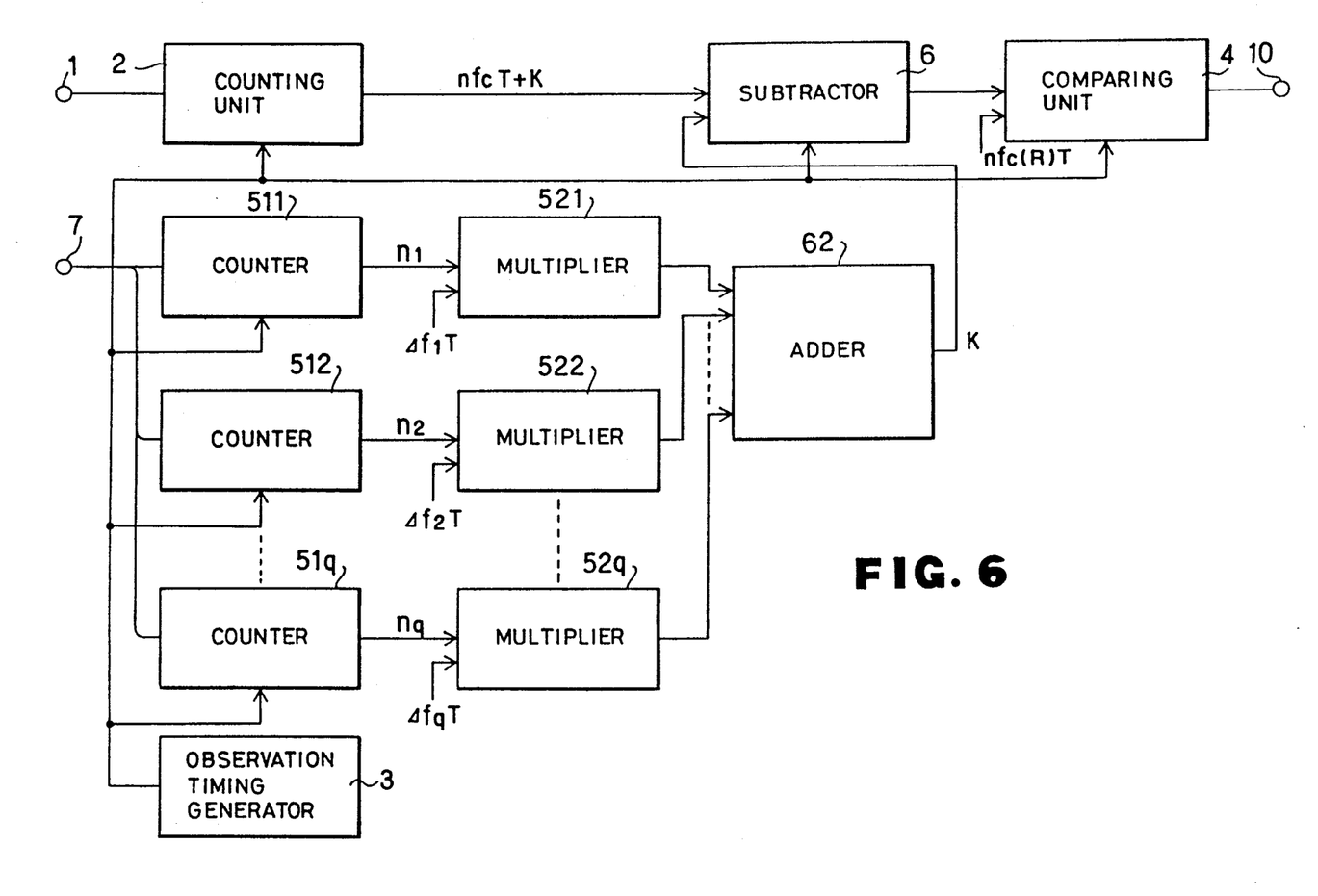
FIG. 6 is a block diagram showing a frequency error detecting apparatus according to a still further embodiment of this invention, which is adapted to detect a frequency error in a multivalue FSK signal.

FIG. 6 is a block diagram showing one example of a frequency error detecting apparatus in which an input signal is a q-value (multivalue) FSK signal. In FIG. 6, designated at numerals 511 through 51q are respectively counters for counting the number of each multibit symbol from a sequence of data demodulated by a demodulating apparatus (not shown) and thereby outputting the number of each symbol counted. Designated at numerals 521 through 52q are respectively multipliers for multiplying outputs from the counters 511 through 51q by displacement or shift frequencies $\Delta f_1$ through $\Delta f_q$ assigned to the individual symbols and the inverse T of the data transmission rate. Designated at numeral 62 is an adder used to add together outputs from the individual multipliers. Other parts shown in FIG. 6 are identified by like reference numerals and are identical to those depicted in FIG. 2.

A description will now be made of the operation of the frequency error detecting apparatus of FIG. 6. When the q-value FSK signal is employed, frequencies assigned to the individual symbols are $f_1=(f_c+\Delta f_1)$, $f_2=(f_c+\Delta f_2)$, ..., $f_q=(f_c+\Delta f_q)$. In doing so, values counted by the counting unit 2 during an observed period nT are as follows:

$$(f_c + \Delta f_1)n_1T + (f_c + \Delta f_2)n_2T + \ldots + (f_c + \Delta f_q)n_qT =$$
$$nf_cT + (\Delta f_1 n_1 + \Delta f_2 n_2 + \ldots + \Delta f_q n_q)T = nf_cT + K$$

where
$n_1$ through $n_q$ represent the number of multibit symbols "1" through "q" within the observed period, and
$\Delta f_1$ through $\Delta f_q$ represent the displacement or shift frequencies of the symbols "1" through "q" from center frequency $f_c$ respectively, and
$n=n_1+n_2+\ldots+n_q$.

In addition, K is equal to $(\Delta f_1 n_1+\Delta f_2 n_2+\ldots \Delta f_q n_q)T$. The shift frequencies $\Delta f_1(R)$ through $\Delta f_q(R)$ which have been set in the receiving side will hereinafter be referred to as $\Delta f_1$ through $\Delta f_q$ in a manner similar to the shift frequencies of the input signals because the differences $(\Delta f_1-\Delta f_1(R))\sim(\Delta f_q-\Delta f_q(R))$ are negligibly small as has already been described.

When an observed cycle or period is started, the counters 511 through 51q count, for each symbol, the number of symbols $n_1$ through $n_q$ which are included in a train of data inputted to the data input terminal 7, respectively, to thereby output the number of symbols $n_1$ through $n_q$ respectively upon completion of the observed period. Next, the multipliers 521 through 52q multiply the number of symbols $n_1$ through $n_q$ by the shift frequencies $\Delta f_1$ through $\Delta f_q$ and the inverse T of the data transmission rate. Then, the adder 62 adds together output values from the respective multipliers 521 through 52q. Accordingly, the sum of the added values becomes K.

On the other hand, the counting unit 2 counts the number of cycles of an input signal during a period of time to be observed and outputs a counted value $nf_cT+K$ therefrom upon completion of the observed period. The subtractor 6 subtracts the output K of the adder 62 from the counted value of the counting unit 2. Thus, the value outputted from the subtractor 6 is $nf_cT$. The comparing unit 4 subtracts $nf_c(R)T$ from $nf_cT$ and outputs a value obtained by dividing the thus-subtracted result by the observed period nT, which value is equivalent to the difference ($f_c - f_cR$) between the center frequencies $f_c$ and $f_cR$.

Figure 7:
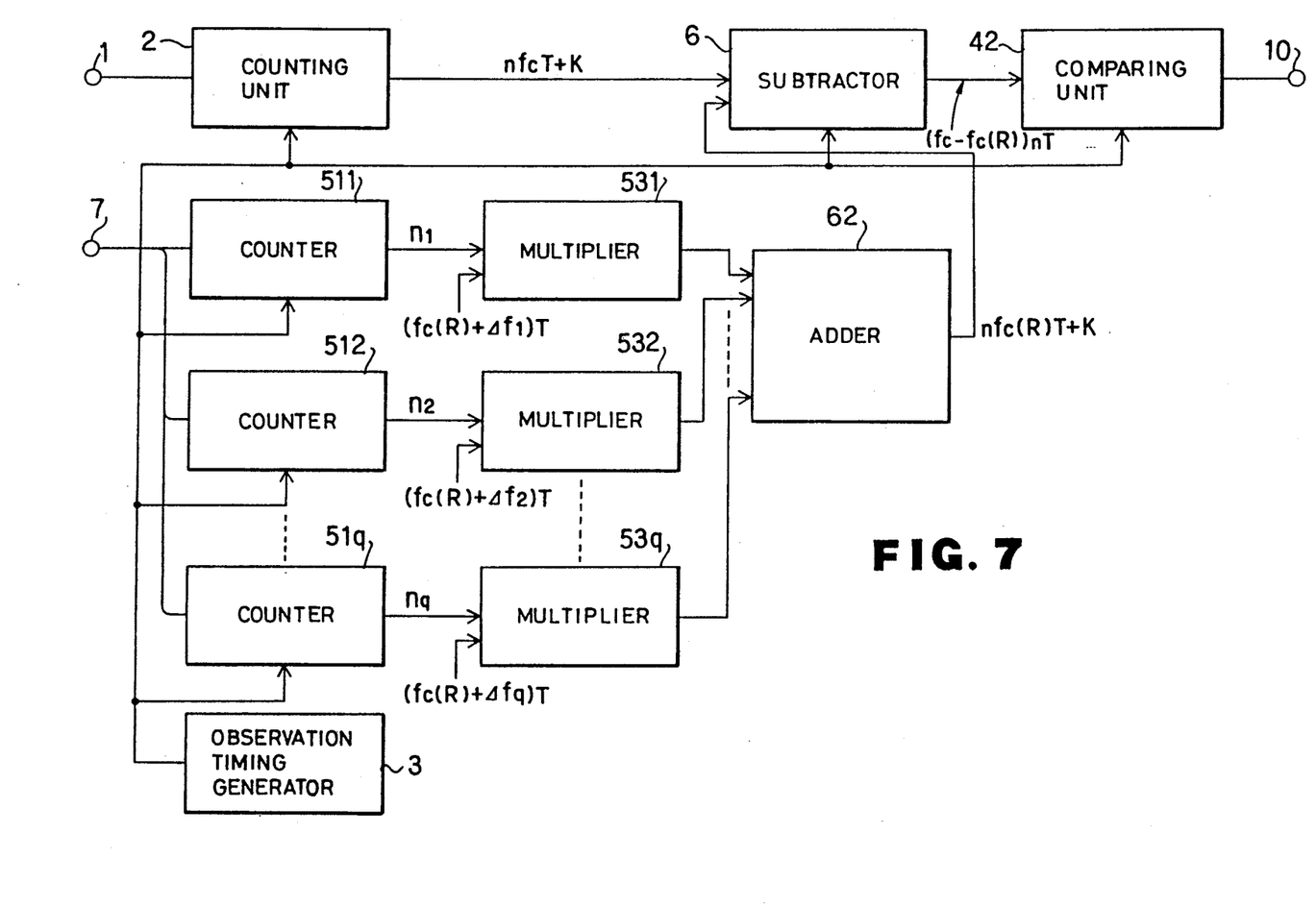
FIGS. 7 and 8 are block diagrams depicting frequency error detecting apparatus according to still other embodiments of this invention, which are adapted to detect frequency errors in multivalue FSK signals.

FIG. 7 is a block diagram showing one example of a frequency error detecting apparatus in which multipliers 531 thorough 53q multiply the number of symbols $n_1$ through $n_q$ by frequencies $(f_c(R)+\Delta f_1) \sim (f_c(R)+\Delta f_q)$ assigned to the individual symbols and the inverse T of the data transmission rate. In this case, a value outputted from adder 62 is $nf_c(R)T+K$. Thus, the value outputted from subtractor 6 is $n(f_c-f_c(R))T$. Therefore, comparing unit 42 can output the difference ($f_c$ and $f_c(R)$) by merely dividing the inputted value by an observed period of time nT.

Figure 8:
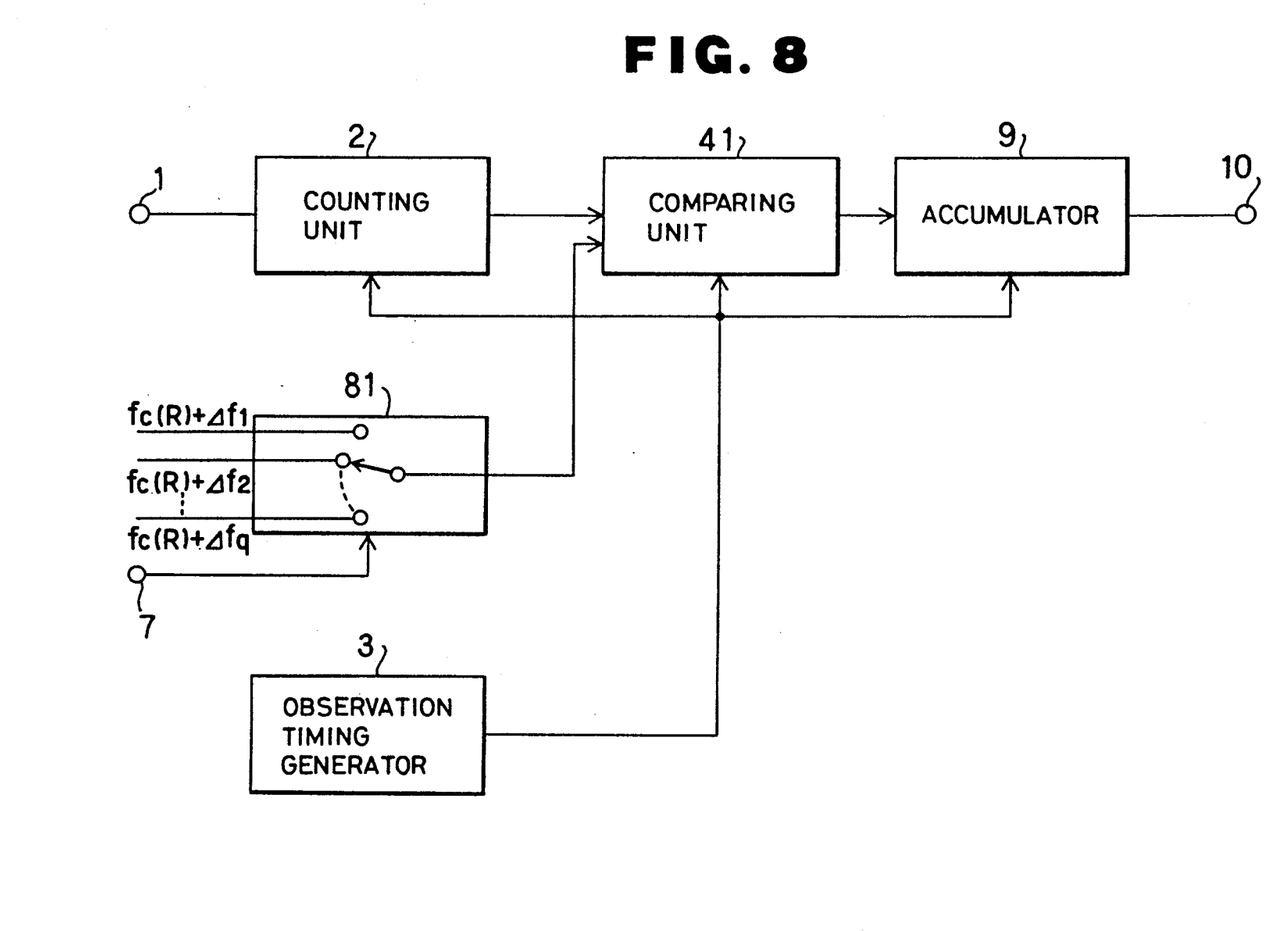

FIG. 8 shows a frequency error detecting apparatus similar to the apparatus shown in FIG. 5A wherein the apparatus has been expanded to receive q-value FSK signals. In FIG. 8, when a counting unit 2 externally receives a timing of change-in-data, it outputs data of already-counted values. At the same time, a switch 81 is changed over to a desired contact depending on the symbol inputted to data input terminal 7, so that a frequency which has been assigned to the symbol is outputted. Then, a comparing unit 41 calculates the difference between an output from the counting unit 2 and the output from the switch 81 to thereby output the calculated result therefrom. Therefore, an error, i.e., the difference $(f_c - f_c(R))T$ between the center frequencies for each symbol may be regarded as being outputted from the comparing unit 41. Thus, a value accumulated by an accumulator 9 after the observed period nT has elapsed is $n(f_c - f_c(R))T$. Whereupon the accumulator 9 outputs a value $(f_c - f_c(R))$ obtained by dividing the so-accumulated value by the observed period nT to an output terminal 10.

Incidentally, a description has been made in a case where the FSK signal is employed in the illustrated embodiments. However, the input signal may be a PSK (phase shift keying) signal. Even in that case, a similar effect can be exhibited.

According to the frequency error detecting apparatus of this invention, as has been described above, the demodulating apparatus demodulates the input data to obtain the correction value from the thus-demodulated data, and the frequency error is outputted after the value counted by the counting means is corrected with the correction value. Thus, there is an advantageous effect in that the frequency error can be detected with high accuracy and at a high speed without being affected by the conditions of the distribution of data produced on the transmitting side.

Having now fully described the invention, it will be apparent to those skilled in the art that many changes and modifications can be made without departing from the spirit or scope of the invention as set forth herein.

What is claimed is:

1. A frequency error detecting apparatus for detecting an error between a center frequency of a received signal and a center frequency of a receiver in an FSK (Frequency Shift Keying) communication system wherein a plurality of distinct data symbols constituting said received signal are each represented by a particular frequency displaced from a center frequency by a shift frequency, comprising:

counting means for counting a number of cycles of said received signal over a predetermined period of time;

correction value generating means for generating a correction value corresponding to the amount of deviation from said center frequency of said received signal included in said number counted by said counting means caused by possible unequal distributions of said distinct data symbols received over said predetermined period of time;

means for correcting said counted number in accordance with said correction value to produce a corrected number; and means for comparing a center frequency represented by said corrected number with said center frequency of said receiver and outputting an error signal equal to the difference therebetween.

2. A frequency error detecting apparatus according to claim 1, wherein said received signal is a binary FSK signal including first and second data symbols represented by frequencies equally displaced above and below the center frequency of the received signal by a predetermined shift frequency.

3. A frequency error detecting apparatus according to claim 2, wherein said correction value generating means comprises:

counter means for counting the difference between said first and second data symbols received over said predetermined period of time; and multiplier means for multiplying said counted difference by an amount proportional to said shift frequency so as to generate said correction value.

4. A frequency error detecting apparatus according to claim 3, wherein said means for correcting comprises:

a subtractor for subtracting said correction value from said counted number to produce said corrected number; and said means for comparing comprises a comparing unit which subtracts a number of cycles of said center frequency of said receiver over said predetermined period of time from said corrected number and divides the result by said predetermined period of time to obtain said error signal.

5. A frequency error detecting apparatus according to claim 3, wherein said means for correcting comprises:

an adder for adding a number of cycles of said center frequency of said receiver over said predetermined period of time to said correction value; and means for subtracting the addition result of said adder from said counted number to produce said corrected number;

said means for comparing divides said corrected number by said predetermined period of time to obtain said error signal.

6. A frequency error detecting apparatus according to claim 2, wherein said correction value generating means comprises:

counter means for counting the quantity of each of said first and second data symbols received over said predetermined period of time;

multiplier means for multiplying each of said counted quantities by an amount proportional to said shift frequency; and an adder for adding outputs of said multiplier means so as to generate said correction value.

7. A frequency error detecting apparatus according to claim 6, wherein said means for correcting and means for comparing comprise a comparing unit which subtracts said correction value from said counted number to obtain said corrected number, and divides said corrected number by said predetermined period of time to obtain said error signal.

8. A frequency error detecting apparatus for detecting an error between a center frequency of a received signal and a center frequency of a receiver in an FSK (Frequency Shift Keying) communication system wherein a plurality of distinct data symbols constituting said received signal are each represented by a particular frequency displaced from a center frequency by a shift frequency, comprising:

counting means for counting a number of cycles of said received signal over a predetermined period of time;

switch means for switching an output between a plurality of values corresponding to shift frequencies associated with each received distinct data symbol for each symbol period included in said predetermined period of time;

means for multiplying said counted number by the values outputted by said switch means; and accumulator means for accumulating the results of multiplication over said predetermined period of time and dividing the accumulated result by said predetermined period of time to produce an error signal equal to the difference between said received signal center frequency and said receiver center frequency, 9. A frequency error detecting apparatus according to claim 1, wherein said received signal is a q-valued FSK signal including m data symbols represented by frequencies respectively displaced from the center frequency of the received signal by predetermined shift frequencies, where $2^m = q$.

10. A frequency error detecting apparatus according to claim 9, wherein said correction value generating means comprises:

counter means for counting the quantity of each of said first and second data symbols received over said predetermined period of time;

multiplier means for multiplying each of said counted quantities by an amount proportional to said shift frequency; and an adder for adding outputs of said multiplier means so as to generate said correction value.

11. A frequency error detecting apparatus according to claim 10, wherein said means for correcting comprises a subtractor which subtracts said correction value from said counted number to obtain said corrected number, and a comparing unit which divides said corrected number by said predetermined period of time to obtain said error signal.

* * * * *

UNITED STATES PATENT AND TRADEMARK OFFICE
CERTIFICATE OF CORRECTION

PATENT NO. : 5,150,382

DATED : September 22, 1992

INVENTOR(S) : Atsuya Kume

It is certified that error appears in the above-identified patent and that said Letters Patent is hereby corrected as shown below:

Column 4, line 22, ".    where" should be --where--.

Column 6, line 28, in the equation, "$n_i$" should be --$n_i$--.

Signed and Sealed this

Twenty-eighth Day of September, 1993

*Attest:*

BRUCE LEHMAN

*Attesting Officer*         *Commissioner of Patents and Trademarks*